United States Patent [19]
Fulton

[11] Patent Number: 5,584,898
[45] Date of Patent: Dec. 17, 1996

[54] SUPERPOLISHING AGENT, PROCESS FOR POLISHING HARD MATERIALS, AND POLISHED HARD MATERIALS

[75] Inventor: Kenneth W. Fulton, Sumner, Wash.

[73] Assignee: Planar Technologies Inc., Stowe, Vt.

[21] Appl. No.: 185,926

[22] PCT Filed: Jul. 20, 1992

[86] PCT No.: PCT/US92/06155

§ 371 Date: Oct. 26, 1994

§ 102(e) Date: Oct. 26, 1994

[87] PCT Pub. No.: WO93/01914

PCT Pub. Date: Feb. 4, 1993

Related U.S. Application Data

[63] Continuation-in-part of Ser. No. 733,306, Jul. 22, 1991, Pat. No. 5,149,338.

[51] Int. Cl.$^6$ ................. B24B 1/00; B24D 3/00
[52] U.S. Cl. ................. 51/309; 51/307; 51/308; 106/3; 106/8; 451/28; 451/36; 451/41; 451/56; 451/63
[58] Field of Search ............... 51/293, 307, 308, 51/309; 106/3, 8; 451/28, 36, 41, 56, 63

[56] References Cited

U.S. PATENT DOCUMENTS

| | | | |
|---|---|---|---|
| 3,618,272 | 11/1971 | Whalen et al. | 451/36 |
| 4,225,349 | 9/1980 | Koshiyama et al. | 103/3 |
| 4,242,842 | 1/1981 | Yancey | 51/298 |
| 4,270,932 | 6/1981 | Perovetz et al. | 51/293 |
| 4,608,293 | 8/1986 | Wada et al. | 428/141 |
| 4,762,534 | 8/1988 | Ito et al. | 51/293 |
| 4,842,618 | 6/1989 | Ito et al. | 51/293 |
| 4,935,039 | 6/1990 | Miyazaki et al. | 51/309 |
| 4,952,240 | 8/1990 | Smith | 106/8 |
| 5,000,761 | 3/1991 | Mayton et al. | 51/295 |
| 5,028,242 | 7/1991 | Ito et al. | 51/295 |
| 5,123,933 | 6/1992 | Ito et al. | 51/293 |
| 5,149,338 | 9/1992 | Fulton | 51/309 |

*Primary Examiner*—Deborah Jones
*Attorney, Agent, or Firm*—Stoll, Miskin, Previto & Hoffman

[57] ABSTRACT

A process for superpolishing hard ceramic substrates, and super polished substrates having surface finishes below about 20 angstroms RMS. In the first embodiment, the process comprises applying a pitch to a lap tool and forming channels in the pitch. The pitch is wetted with a polishing compound comprising colloidal alumina and powder of a substance harder than that being polished. The substrate is brought into contact with the wetted pitch, and relative motion is applied thereto to polish the substrate. In a second embodiment, microporous pads are used which absorb the polishing compound and contact the substrate to polish the same.

19 Claims, 2 Drawing Sheets

5,584,898

SUPERPOLISHING AGENT, PROCESS FOR POLISHING HARD MATERIALS, AND POLISHED HARD MATERIALS

BACKGROUND OF THE INVENTION

This application is a 371 of PCT/US92/06155, filed Jul. 20, 1992 and a CIP of USPN 07/733,306, filed Jul. 22, 1991, now U.S. Pat. No. 5,149,338.

Beryllium has many properties that make it desirable for use in severe environments. Such properties include low density, good thermal conductivity, good infrared reflectivity, high stiffness, low coefficient of thermal expansion at cryogenic temperatures, and small nuclear cross section. However, the high toxicity of beryllium powders has minimized its use. In addition, superpolished beryllium surfaces tend to lose their low scatter quality due to oxidation. Beryllium also has a relatively high porosity, which can result in deleterious voids and etches forming on the finished product.

One such environment is computer hard disk drives and read-write heads. Hard disk drives require a thin disk, but one hard enough to avoid breakage at high speed, and hard enough to withstand thermal changes and also provide a smoother surface finish, thereby resulting in increased memory capacity.

As a result of the foregoing drawbacks of beryllium, when high strength silicon carbide (SIC) has been used in lieu of beryllium, it has demonstrated considerable advantages and much success in severe environment applications. It exhibits excellent oxidation and creep resistance, and is believed to outerform beryllium in many if not all applications.

For many applications including hard disk drive, super conductor wafer applications and high-reflective optics, superpolished surfaces are required. Conventional polishing techniques are capable of producing a polished surface having a surface roughness on the order of about 100Å RMS (root mean squared). However, decreased surface roughness has obvious advantages depending on the application. For example, in computer hard disk drive applications, surface roughness less than 10Å RMS would allow substantially more information per disk area. Similarly, in laser application, a 10Å RMS mirror surface would allow for more efficient operation by creating higher laser reflectivity (therefore lower laser absorption), thus lessening the possibility of mirror burns.

Accordingly, there exists a need for producing hard materials having superpolished surfaces with a surface roughness below about 20Å RMS, and indeed, as low as about 0.5Å RMS even with substrate diameters of 10–12 inches or larger.

SUMMARY OF THE INVENTION

The problems of the prior art have been solved by the present invention, which provides a process for superpolishing hard materials, and the resulting superpolished hard materials having surface roughnesses below about 20Å RMS. The present invention is especially applicable to the polishing of silicon carbide, CVD-coated (chemical vapor deposit) silicon carbide, pure CVD silicon carbide, Alsimag™ (AIO$_2$TiC), alumina, sapphire, and other hard ceramic materials. The low angstrom finish can be achieved even with wafers having diameters as large as about 10 to 12 inches or larger. Flats, aspherics, cylinders, toroids, etc. can all be polished in accordance with the instant invention.

DETAILED DESCRIPTION OF THE INVENTION

Figure 1:
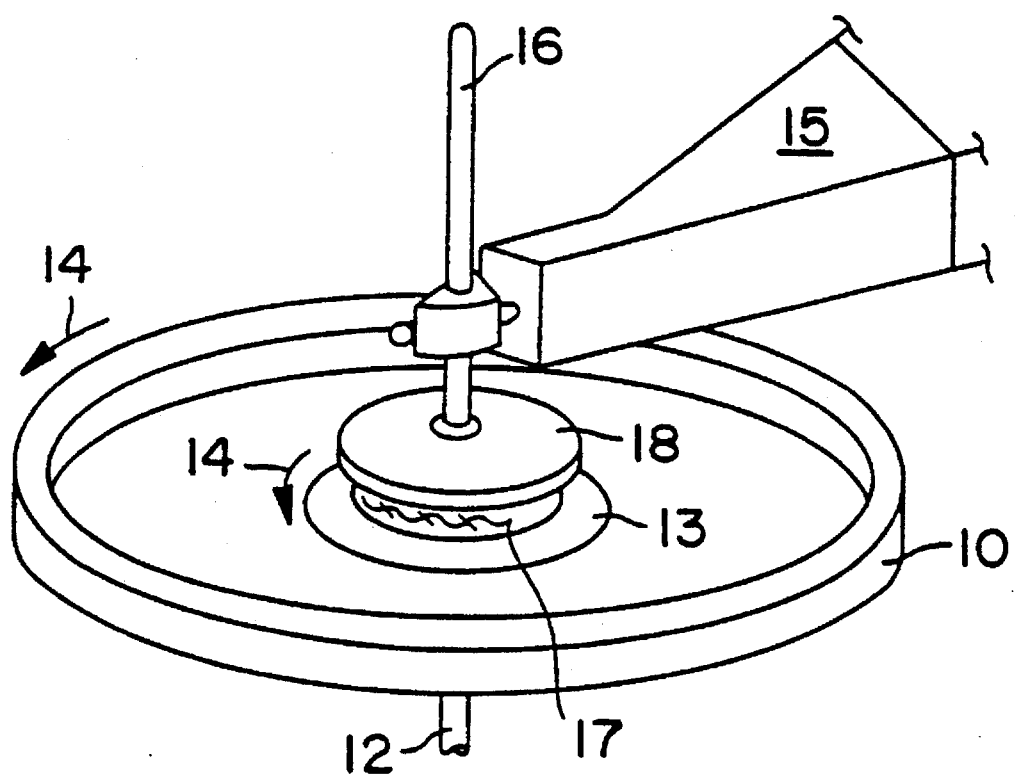
FIG. 1 is a partial view of the apparatus used in accordance with one embodiment of the present invention.

In accordance with the present invention, there is provided a polishing compound capable of providing hard ceramic materials with fine surface finishes when used in accordance with the present process. The polishing compound includes a polishing agent, which in turn includes a dispersion of oxides of alumina in water, the alumina having particle diameters of 0.05 microns and the dispersion having a pH of about 4. The polishing agent is available commercially from Nyacol Products, Inc. of Massachusetts. Alternatively, the polishing agent that can be used is a colloidal alumina polishing compound available commercially from Solutions Technology as "200A Ultra Sol Colloidal Alumina Compound". The polishing agent is then combined with deionized or distilled water and a powder of a substance that is harder than the substrate being polished to form the polishing compound. The alumina in the polishing compound reduces friction during polishing, and the colloidal alumina compound helps to keep the powder in suspension. Suitable powders include natural diamond powder, synthetic diamond powder such as zirconium powder, and a boron carbide powder such as NORBIDE, available from The Norton Company. The powders may be used alone or in combination. Preferably the powder is natural diamond powder. Where natural diamond powder is used, the diamond powder particles combined with the polishing compound should have a size range of from about greater than zero to about 15 microns, depending on the final surface roughness desired. Where fine polishing is desired, preferably the size of the powder particles is between about 0.25 and about 10 microns, most preferably about 3 microns or less. Where a rougher finish is acceptable, the size of the powder particles can be about 10 to about 15 microns. The boron carbide powder particle size can be from about 800 microns to about 1500 microns, preferably about 1200 microns to about 1500 microns, again depending upon the desired finish.

The powder and water are combined with the polishing agent by any suitable means, such as mixing. A slurry of the powder in the polish is formed. The amount of powder added to the polishing agent depends in part on the speed at which the polishing process is to be accomplished. The more powder added, the faster the process. However, economics limit the amount of powder to be added. Preferably, about ½ carat of diamond powder is added to about 8 ounces of equal parts of polishing agent and water. Those skilled in the art can determine the appropriate amount of powder to be added without undue experimentation, depending upon the application and desired polished finish.

Since the viscosity of the polishing agent is relatively high, it must be diluted with water. Preferably about 1 part of water is added per 1 part of polishing agent. If too much water is added, the effect of the powder on polishing is deteriorated. If not enough water is added, the polishing agent will dry too quickly during the polishing, and the powder won't be suspended in the solution as well.

Conventional polishing apparatus can be used in carrying out the process according to the present invention. In accordance with a first embodiment of the present invention, such apparatus includes the Precision Polishmaster 12 inch work capacity model 6DE, sold commercially by R. Howard Strasbaugh, Inc. Other suitable apparatus is partially illustrated in FIG. 1. There it is shown that a well 10 is formed in which is housed a vertical machine spindle 12. A polishing tool 13 which can have various sizes depending upon the size of the wafer to be polished has an aperture (not shown) which is adapted to affix to the spindle 12. The spindle is connected to drive means to impart thereto rotary motion in the direction of the arrow 14. Arm 15 has a pin 16 which fits into a holder and blocking tool 18, which in turn holds the substrate 17 to be polished. The arm 15 is connected to drive means to impart horizontal motion thereto.

When using such apparatus or the like, since the materials being polished in accordance with the present invention are hard ceramics, a hard polishing lap material should be used. Preferably, the lap material is "CYCAD CLEARGOLD Optical Polishing Pitch" available commercially from Cycad Products. In the first embodiment of the present invention, the lap material is heated in a suitable container until it is in liquid form. The liquid pitch is then applied to the polishing tool (typically an aluminum plate) in a suitable thickness, such as ¼ inch. The pitch can be so applied by any suitable means, such as by dipping, or by pouring it onto the tool. The pitch is allowed to cool in the desired configuration, which corresponds to the configuration of the substrate to be polished. For example, where the substrate to be polished is concave, the pitch is applied so that when hardened, it forms a convex shape into which the concave substrate conforms. Once cooled, small channels or grooves are cut into the pitch which will allow the polishing agent slurry to penetrate and flow to keep the lap wet. The channels can be any configuration which allows adequate penetration. The inventor of the present invention has found that a criss-cross pattern is usually appropriate. Preferably the channels are cut to a depth of about ½ inch, and are of a width slightly greater than that of a conventional razor blade.

The polishing agent prepared as disclosed above is applied to the polishing lap with a brush. Sufficient agent is applied so that the channels formed in the lap are penetrated and the lap is wet.

The substrate is then brought into contact with the lap and desired weights are placed over the pin. The machine is turned on, thus beginning the actual polishing process, which is carried out until the desired surface roughness is achieved. The surface roughness can be measured with a High Performance, Noncontact, Surface Profiler, and compared to Bureau of Standards test plates. Those skilled in the art will recognize that the stroke of the machine can be changed until the desired surface roughness is achieved. For example, if a more convex curve is desired, this can be accomplished by adjusting the stroke to sweep over each side. Alternatively, if a more concave curve is desired, the stroke is adjusted to make shorter sweeps across the substrate, thus concentrating more pressure in the center.

Figure 2:
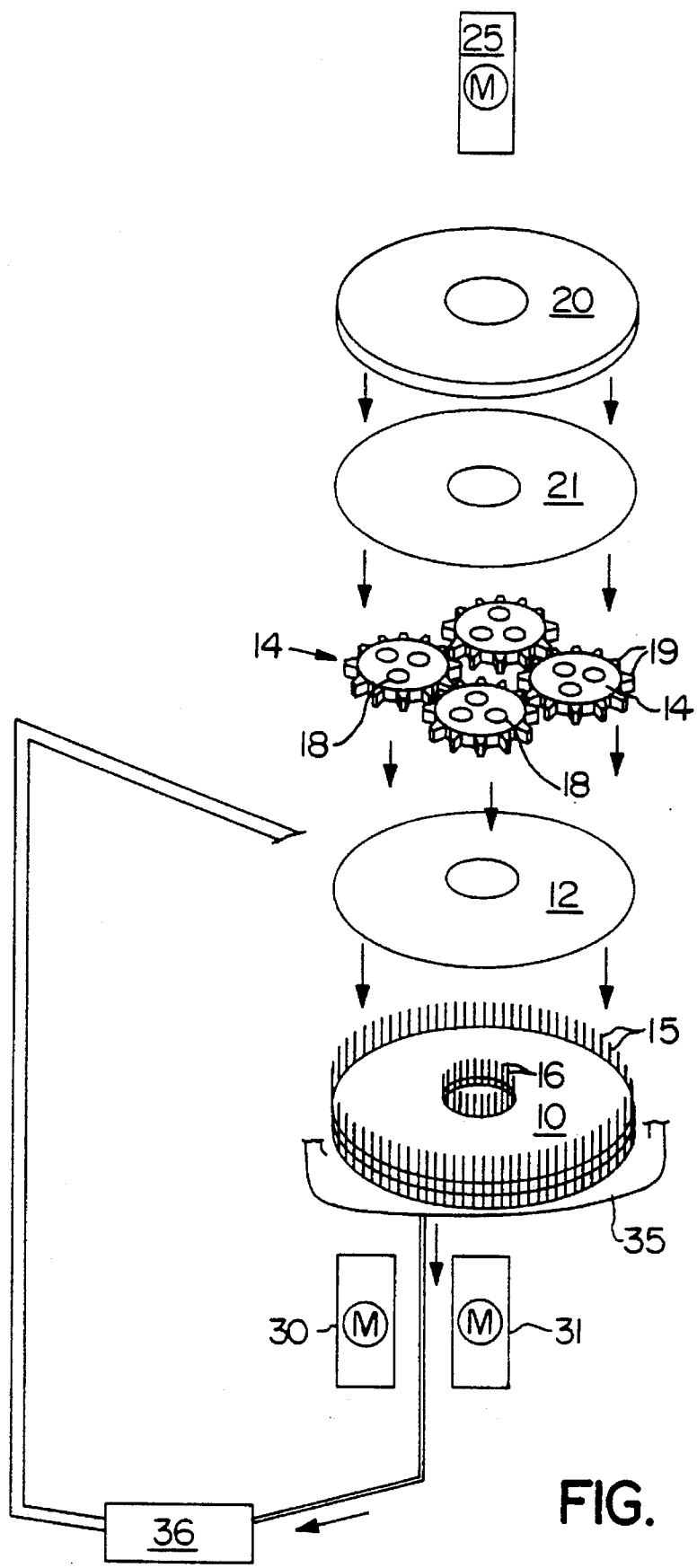
FIG. 2 is an exploded partial view of the apparatus used in accordance with another embodiment of the present invention.

In a second embodiment of the present invention, the apparatus used to polish the hard ceramic substrates is exemplified by the microLine machines commercially available from Peter Wolters Maschinenfabrik GmbH & Co., such as models AC 600 and AC 800; the Strasbaugh Model 6S-R4 double surface polishmaster; or the Speed faro 2-way planetary double side lapping polishing machine. This embodiment is especially applicable where polishing of both the top and bottom surfaces of the material to be polished is desired, although one-side polishing can also be obtained using this embodiment. Important components of suitable apparatus are partially illustrated in FIG. 2. A lower flat polishing tool 10, which can be cast iron, aluminum, or preferably a corrosion resistant material such as stainless steel is shown. The tool 10 is surrounded by a receptable 35 in communication with a pumping system for catching and recirculating polishing compound as described below. The tool 10 supports a polishing pad 12, which is preferably a microporous blown polyurethane material available commercially from Rodel Products Corp. as an "IC-60" pad. The pad 12 can be adhered to the surface of tool 10 by any suitable means, such as with a suitable adhesive, and provides a sponge-like function to be described in more detail below. Wafer carrier plates 14 each having a plurality of wafer cutouts or wells 18 are situated on the pad 12, the outer circumference of the carrier plates 14 having teeth 19 which couple with outer pins 15 and inner pins 16 on tool 10 for imparting rotary motion to the carriers. The wells 18 are appropriately dimensioned so as to accept the size wafers being polished. An outer gear pins motor 30 and an inner gear pins motor 31 provide rotary motion. (Wafer carrier plates 14 are easily removable and can be substituted with plates having different sized wafer wells to accommodate different size wafers). A top cover (not shown) includes an upper tool 20 and an upper pad 21 similar to tool 10 and pad 12, respectively. Preferably the top cover has a diameter substantially corresponding to the diameter of the lower tool 10, such that the cover fits over the wafers and encloses the same so as to form a polishing chamber. Any other suitable means for enclosing a polishing chamber also can be used. Means for imparting rotary motion to the upper pad 21 in the top cover is provided, such as a motor 25.

The polishing compound prepared as disclosed above is supplied to the polishing chamber by any suitable means, such as by pumping the compound from a reservoir 36 to the polishing chamber. Sufficient compound is supplied so that the pads 12 become saturated with the compound. During the polishing, additional polishing compound can be added to the chamber as needed. Preferably, the apparatus recycles spent compound back to the chamber.

In operation, the substrates to be polished are placed in appropriately dimensioned wafer carriers. Polishing compound is supplied to the machine reservoir, from which it is pumped to the polishing chamber. The pad 12 in the top cover, the pad 12 on the lower tool 10, and the substrates to be polished (by way of the wafer carriers 14) are caused to rotate, the latter such as by the speed of rotating pins 15, 16. Polishing compound exuding from the pads 12 contacts both sides of the wafer, thereby polishing the same. The polishing is continued until the desired surface finish is achieved. The surface roughness can be measured with a laser interferometric microscope, such as a Zygo high performance, noncontact, surface profiler, and compared to Bureau of Standards test plates.

By using either embodiment of the process in accordance with the present invention, a superpolished product can be obtained having a surface roughness below about 20Å RMS, and indeed as low as about 0.5Å RMS. Although the present invention is not to be limited thereby, it is believed that the low angstrom finish that can be achieved with the method of the present invention is a result of the combination of the polishing compound and the polishing technique used. The powder in the polishing compound polishes the substrate. As the polishing process continues, the powder breaks down into even finer particles, thus creating a finer polishing finish on the substrate.

The following example will serve to illustrate the various embodiments of the present invention.

EXAMPLE 1 - First Embodiment

Preparation of Pitch

A can of CYCLAD CLEARGOLD Optical Polishing Pitch is heated until the contents are in liquid form. A dam approximately ½ inch high is formed around an aluminum polishing tool with conventional masking tape. The pitch is poured onto the tool to a thickness of about 1.4 inch. A pressing lap is used to shape the pitch, and the pitch is allowed to harden at room temperature. Once hardened, channels are cut into the pitch with a razor blade in a criss-cross pattern. Since the area of the pitch is larger in this case than that of the substrate to be polished, the circumference of the pitch which will fall outside the stroke of the substrate is scarred to prevent chipping of the pitch during polishing. The dam is maintained on the lap.

Preparation of Polishing Compound

About four ounces of 200Å Ultra Sol Colloidal Alumina Compound is poured into a container. After adding about four ounces of deionized water, about ½ carat of 3 micron diameter diamond powder is added, and the resulting solution is stirred with a brush.

Polishing Procedure

A layer of wax is applied to a blocking tool having a backing plate. The wax is heated, a 3-inch diameter CVD silicon carbide wafer is pressed onto the tool, and the wax is allowed to cool, thereby adhering the wafer to the tool.

The polishing compound is brushed onto the lap, and the substrate is brought into contact with the lap. The machine arm is lowered so that its pin sits in an aperture in the backing plate of the blocking tool. The machine is turned on, causing rotation of the lap and a horizontal stroke of the substrate. A five pound weight is placed on the blocking tool, and a second five pound weight is placed on the machine arm. A brush is secured to the machine in such a manner so that it is in contact with the lap but does not interfere with the substrate. The brush continuously mixes the polishing compound on the lap.

Additional polishing compound may be added. The polishing compound added can have powders of different particle dimensions, depending upon the degree of polishing desired.

The polishing is continued until the desired finish is achieved.

EXAMPLE 2 - Second Embodiment

Preparation of Polishing Compound

About four ounces of 200A Ultra Sol Colloidal Alumina Compound is poured into a container. After adding about four ounces of aleionized water, about ½ carat of 3 micron diameter diamond powder is added, and the resulting solution is stirred with a brush.

Polishing Procedure

The polishing machine is fitted with a flat lower stainless steel polishing tool on which is adhered a lower IC-60 pad. An upper IC-60 pad is fitted to upper tooling in the cover. Wafer carriers are positioned on the lower pad, the carriers each having a plurality of 3-inch wafer wells. 3-inch diameter CVD silicon carbide wafers are placed in the wells, and the cover and upper polishing tool are lowered such that the cover is placed over the wafers and carriers to enclose the polishing chamber. The machine reservoir is filled with the polishing agent prepared above.

The machine is turned on, causing rotation of the upper polishing pad, the lower polishing pad, the carriers and the stainless steel plate. Polishing compound is pumped from the reservoir to the polishing chamber, and is absorbed and exuded by the pads.

The polishing is continued until the desired finish is achieved. Additional polishing compound may be added having powders of different particle dimensions, depending upon the degree of polishing desired.

What is claimed is:

1. A process for polishing a hard ceramic material having a top and bottom surface, comprising:
    a. providing a polishing chamber, said polishing chamber being defined by a polishing tool base and a polishing tool cover;
    b. adhering a lower microporous pad to said polishing tool base;
    c. adhering an upper microporous pad to said polishing tool cover;
    d. supporting said hard ceramic material in said polishing chamber such that said bottom surface contacts said lower microporous pad and said top surface contacts said upper microporous pad;
    e. supplying to said polishing chamber a polishing compound comprising colloidal alumina and a powder of a substance that is harder than said material to be polished; and
    f. imparting relative motion to said material to be polished.

2. The process of claim 1 wherein said powder is selected from the group consisting of natural diamond, boron carbide and synthetic diamond powder.

3. The process of claim 2 wherein said powder comprises natural diamond powder having particles of diamond that average about 3 microns in diameter.

4. The process of claim 1 wherein said hard ceramic material comprises silicon carbide.

5. The process of claim 1 herein said hard ceramic material comprises CVD coated silicon carbide.

6. The process of claim 1 wherein said relative motion is imparted by spinning said polishing tool base.

7. The process of claim 1 wherein said hard ceramic material is polished to a surface roughness less than about 10 angstroms RMS.

8. The process of claim 1 wherein said hard ceramic material is polished to a surface roughness of about 2 angstroms RMS.

9. The process of claim 1 wherein said hard ceramic material is polished to a surface roughness of about 0.5 angstroms RMS.

10. A superpolished hard ceramic material polished according to the method of claim 1.

11. The process of claim 1 wherein said polishing compound is continuously recycled during polishing.

12. A hard ceramic substrate having a polished surface roughness of less than about 20 angstroms RMS.

13. The hard ceramic substrate of claim 12 having a polished surface roughness of less than about 10 angstroms RMS.

14. The hard ceramic substrate of claim 12 having a polished surface roughness of about 2 angstroms RMS.

15. The hard ceramic substrate of claim 12 having a polished surface roughness of about 0.5 angstroms RMS.

16. The hard ceramic substrate of claim 12 wherein said substrate comprises a material selected from the group consisting of silicon carbide, CVD-coated silicon carbide, and pure CVD silicon carbide.

17. The hard ceramic substrate of claim 12 wherein said substrate has a diameter of about 12 inches or less.

18. The hard ceramic substrate of claim 12 wherein said substrate has a diameter of about 12 inches or more.

19. A superpolishing agent for polishing hard ceramic materials, comprising a dispersion of oxides of alumina in water, said oxides of alumina having an average particle diameter of about 0.05 microns, deionized water, and powder of a substance harder than said hard ceramic material, said dispersion and deionized water being present in about equal volumes.

* * * * *